United States Patent [19]

Cham et al.

[11] Patent Number: 4,493,016

[45] Date of Patent: Jan. 8, 1985

[54] RECTIFIER TRANSFORMER

[75] Inventors: Edward J. Cham, Warren, Ohio; Theodore R. Specht, Sharon, Pa.

[73] Assignee: Westinghouse Electric Corp., Pittsburgh, Pa.

[21] Appl. No.: 433,322

[22] Filed: Oct. 7, 1982

[51] Int. Cl.³ .............................................. H02M 7/06
[52] U.S. Cl. ..................................... 363/126; 336/215
[58] Field of Search ....................... 363/114, 125, 126; 336/5, 12, 215

[56] References Cited

U.S. PATENT DOCUMENTS

| | | | |
|---|---|---|---|
| 1,610,492 | 12/1926 | Cole | 336/5 |
| 1,847,920 | 3/1932 | Blume . | |
| 1,928,848 | 10/1933 | Crout . | |
| 1,964,521 | 6/1934 | Kubler . | |
| 2,194,412 | 3/1940 | Trabut . | |
| 2,418,643 | 4/1947 | Huge . | |
| 2,595,753 | 5/1952 | Beardsley | 336/12 |
| 2,922,972 | 1/1960 | Gordy | 336/5 |
| 3,026,466 | 3/1962 | Friedrich . | |
| 3,026,467 | 3/1962 | Barnes . | |
| 3,395,373 | 7/1968 | Stephens | 336/12 |
| 3,509,507 | 4/1970 | Specht | 336/12 |
| 3,671,901 | 6/1972 | Lys | 336/5 |

Primary Examiner—William M. Shoop
Assistant Examiner—Jeffrey L. Sterrett
Attorney, Agent, or Firm—D. R. Lackey

[57] ABSTRACT

A rectifier transformer circuit permitting six-phase double-wye operation with 120° conduction, (without the use of an interphase transformer), and providing any predetermined degree of phase shift. The transformer comprises a zig-zag wye primary winding and a six-phase star secondary winding. By choosing the proper ratio for the turns of the zig and zag portions of the primary winding, any degree of phase shift can be obtained. The rectifier transformer is ideally suited for multiple-phase installations wherein several rectifier transformers are used, each providing a different amount of phase shift, without the use of separate phase-shift transformers.

11 Claims, 12 Drawing Figures

RECTIFIER TRANSFORMER

BACKGROUND OF THE INVENTION

1. Field of the Invention

This invention relates generally to rectifier transformers used with rectifier assemblies and other power conversion apparatus for transforming an alternating current signal to direct current, and more specifically to a rectifier transformer circuit for single way, six pulse operation, 120° diode and secondary winding conduction, with an integral phase-shift winding arrangement, and without an interphase transformer.

2. Description of the Prior Art

Several transformer configurations for use with semiconductor power rectifiers are well-known in the art. The transformer primary winding is connected to a three-phase ac power line to provide voltage to the rectifiers, via a secondary winding, connected to furnish voltages at uniformly distributed phase angles. Since rectifiers tend to draw a square wave current from the power system, they are a source of harmonic currents in the power system. Such harmonic currents induce noise voltage in adjacent communication circuits and cause additional and unwanted heating in motors, capacitors, and generators.

To reduce the harmonics, it is common practice in rectifier installations to increase the number of rectifier phases (i.e., the number of pulses appearing in the rectified dc signal). For large rectifier installations, 96-phase operation is not uncommon. To obtain the necessary multi-phase operation it is customary to use six pulse circuits with phase-shifted rectifier transformers having delta or wye primary windings. The secondary windings and rectifiers for each transformer are identical. As an example, a typical 24-phase rectifier system consists of four rectifier transformers each arranged for six-pulse operation and connected as follows: (1) wye plus 7½° shift, (2) wye minus 7½° shift, (3) delta plus 7½° shift, and (4) delta minus 7½° shift. This arrangement provides 24-phase overall operation, and theoretically the ac side has harmonics of only multiples of twenty-four plus or minus one. It is apparent that other combinations of phase shift are possible to obtain a 24-phase system.

To provide this multi-phase operation the prior art rectifier circuits require, in one type of rectifier assembly a separate phase-shift transformer, and in a second type of rectifier assembly a phase-shift winding as a part of the rectifier transformer and an interphase transformer. An advantage of the present invention is the elimination of the phase-shift transformer in the first design, and elimination of the interphase transformer in the second.

SUMMARY OF THE INVENTION

A rectifier transformer circuit for providing a rectified ac signal is disclosed. The rectifier transformer has a zig-zag wye primary coil and a six-phase star secondary coil. A rectifier anode terminal is connected to each winding of the secondary coil. The cathode terminals of the rectifiers are connected together such that the rectified ac voltage is produced between the center terminal of the wye secondary coil and the cathode terminals. The magnetic flux path circuit for the rectifier transformer is three single-phase cores or the magnetic equivalent thereof.

BRIEF DESCRIPTION OF THE DRAWINGS

The invention may be better understood, and further advantages and uses thereof more readily apparent, when considered in view of the following detailed description of exemplary embodiments, taken with the accompanying drawings, in which.

DESCRIPTION OF THE PREFERRED EMBODIMENT

Figure 1:
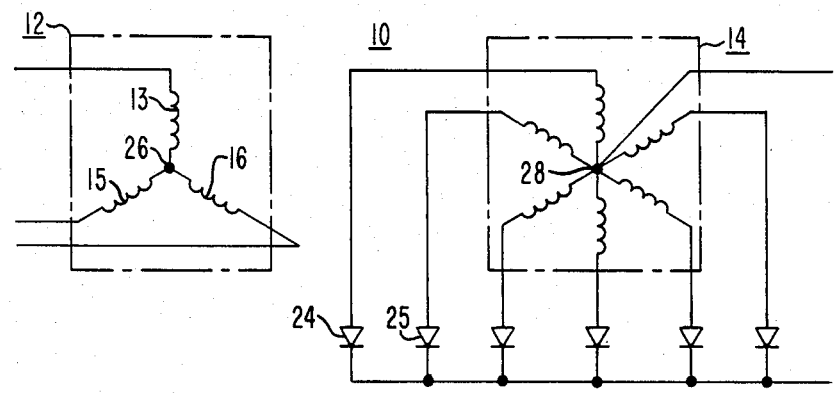
FIG. 1 illustrates a prior art rectifier transformer circuit in schematic form.

To better understand the inventive features of the present invention, it is necessary to discuss two versions of prior art rectifier transformers. FIG. 1 shows a prior art rectifier transformer 10. The rectifier transformer 10 includes a wye primary winding 12, a six-phase star secondary winding 14, and is wound on three single-phase cores or the magnetic equivalent thereof (not shown in FIG. 1). The wye primary winding 12 comprises coils 13, 15 and 16. The rectifier transformer 10 provides single-way rectification with 120° rectifier conduction and six-pulse output. An interphase transformer is not used. Two adjacent diodes, for example diodes 24 and 25, conduct simultaneously. As the primary currents in the conducting phase must be equal, the secondary currents are also equal. The prior art rectifier circuit of FIG. 1 provides non-sinusoidal voltages on each phase, with a zero-sequence component. The single phase cores permit this zero-sequence component; its existence is required for proper operation, therefore allowing oscillation of an input neutral terminal 26 and an output neutral terminal 28.

Figure 2:
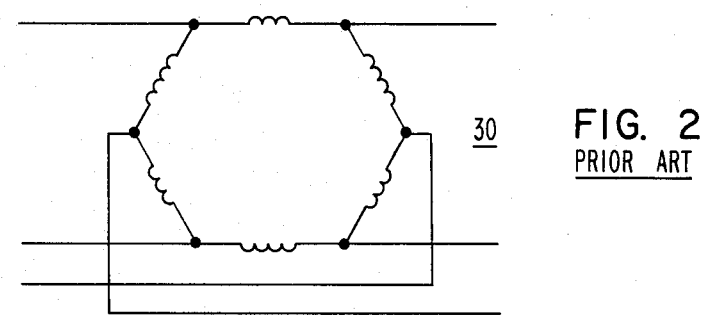
FIG. 2 illustrates a prior art phase-shift transformer in schematic form.

Although very desirable, the rectifier transformer 10 has not been used extensively due to the need for a separate phase-shift transformer, such as phase shift transformer 30 illustrated in FIG. 2, to cancel the source harmonic currents when several rectifier transformers like the rectifier transformer 10, are used together. The rectifier transformer 10 cannot be used with a delta primary, as is well known to those skilled in the art. The transformer of the present invention overcomes this problem because it can be designed for any degree of phase shift thereby eliminating the need for separate phase shift transformers (such as the phase shift transformer 30 of FIG. 2) when several rectifier transformers like the rectifier transformer 10 are used together.

Figure 3:
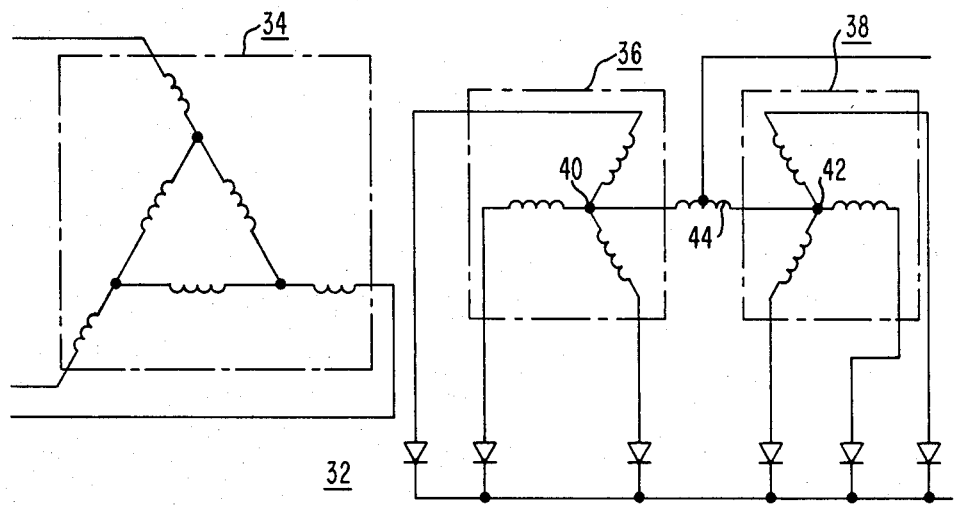
FIG. 3 shows a schematic of a prior art rectifier transformer circuit.

A popular prior art rectifier transformer circuit is illustrated in FIG. 3. Referring to FIG. 3, there is shown a rectifier transformer 32 utilizing a delta-connected primary winding 34 and double-wye secondary windings 36 and 38. A neutral terminal 40 of the secondary winding 36 is connected to a neutral terminal 42 of the secondary winding 38 via an interphase transformer 44. The present invention is a direct replacement for the rectifier transformer 32, i.e., the rectified dc output voltage of the present invention is essentially identical to that of the rectifier transformer 32. An advantage of the present invention is the elimination of the interphase transformer 44. Since the interphase transformer 44 represents a large portion of the rectifier transformer 32, elimination thereof reduces cost and increases efficiency. In the rectifier transformer 32 phase shift has been incorporated into the delta-connected primary winding 32 as shown in FIG. 3.

To summarize, two prior art rectifier assembly configurations with phase shift have been discussed. The first configuration is the rectifier transformer 10 of FIG. 1 for use with a phase shift transformer (such as that shown in FIG. 2). An interphase transformer is unnecessary for this configuration. The second configuration is illustrated by rectifier transformer 32 of FIG. 3 where the delta-connected primary winding 34 provides the phase shift, but the interphase transformer 44 is required.

Figure 4:
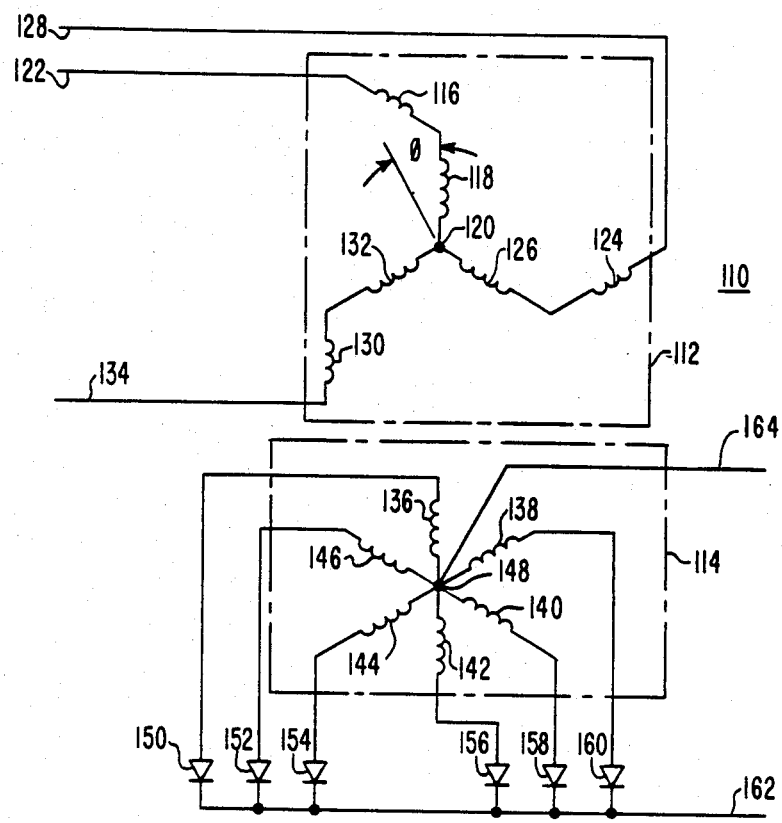
FIG. 4 illustrates a rectifier transformer circuit constructed according to the teachings of the present invention.

FIG. 4 shows a rectifier transformer 110 comprising a primary winding 112 and a secondary winding 114. A series combination of coils 116 and 118 of the primary winding 112 is connected between a neutral terminal 120 and a power line conductor 122. The coils 116 and 118 are arranged to provide a phase shift $\phi$.

A series combination of coils 124 and 126 is connected between the neutral terminal 120 and a power line conductor 128; coils 124 and 126 are also configured to provide a phase shift $\phi$. Lastly, a series combination of coils 130 and 132 is connected between the neutral terminal 120 and a power line conductor 134. The coils 130 and 132 are also arranged to provide the phase shift $\phi$.

In the secondary winding 114 first terminals of coils 136, 138, 140, 142, 144, and 146, are connected together at a neutral terminal 148. The voltages in the coils 136, 138, 140, 142, 144, and 146, are displaced 60 electrical degrees. A second terminal of the coil 136 is connected to an anode terminal of a rectifier 150; a second terminal of the coil 138 is connected to an anode terminal of a rectifier 160; a second terminal of the coil 140 is connected to an anode terminal of a rectifier 158. A second terminal of the coil 142 is connected to an anode terminal of a rectifier 156; a second terminal of the coil 144 is connected to an anode terminal of a rectifier 154; a second terminal of a coil 146 is connected to an anode terminal of a rectifier 152. Cathode terminals of the rectifiers 150, 152, 154, 156, 158, and 160 are connected to a conductor 162. A conductor 164 is connected to the neutral terminal 148, and the rectified ac voltage appears between the conductors 164 and 162. In operation, two adjacent coils (or phases) of the secondary winding 14 conduct simultaneously. Each phase, and its associated rectifier, carried current for 120 electrical degrees.

Figure 6:
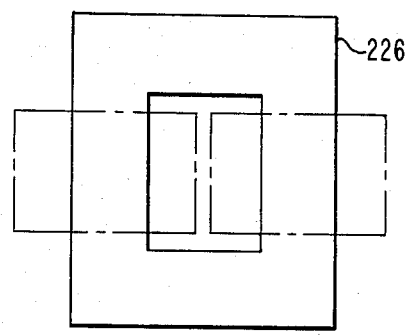
FIG. 6 shows a single-phase core-form core suitable for practicing the present invention of FIG. 4.
Figure 7:
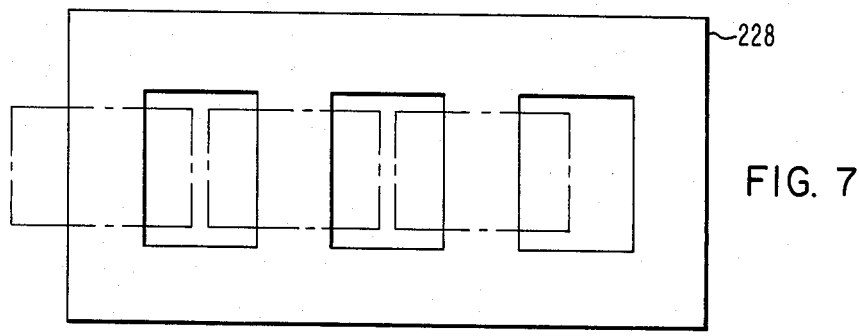
FIG. 7 shows a four-legged core-form core suitable for practicing the present invention of FIG. 4.
Figure 8:
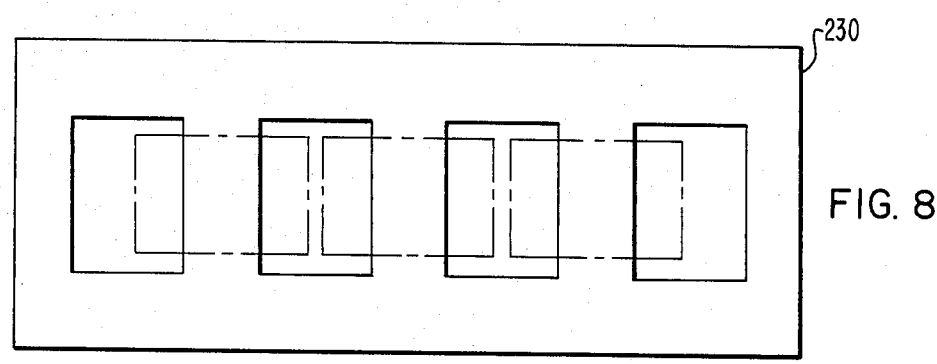
FIG. 8 shows a five-legged core-form core suitable for practicing the present invention of FIG. 4.
Figure 11:
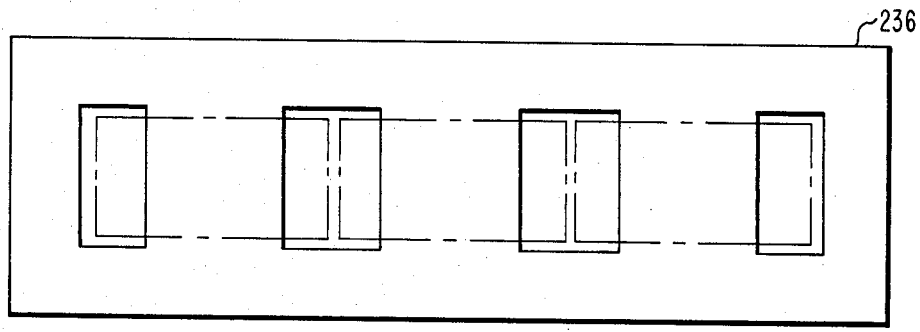
FIG. 11 shows a five-legged shell-form core suitable for practicing the present invention of FIG. 4.
Figure 9:
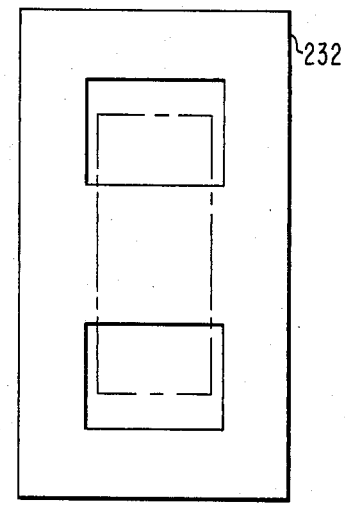
FIG. 9 shows a single-phase shell-form core suitable for practicing the present invention of FIG. 4.
Figure 10:
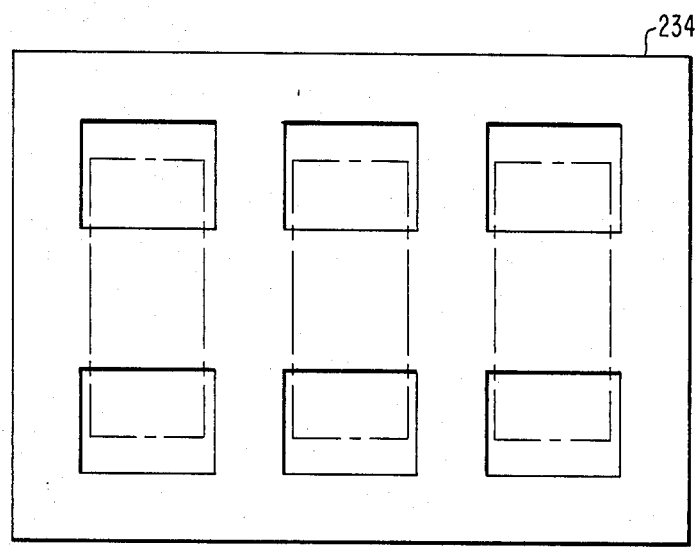
FIG. 10 shows a four-legged shell-form core suitable for practicing the present invention of FIG. 4.
Figure 12:
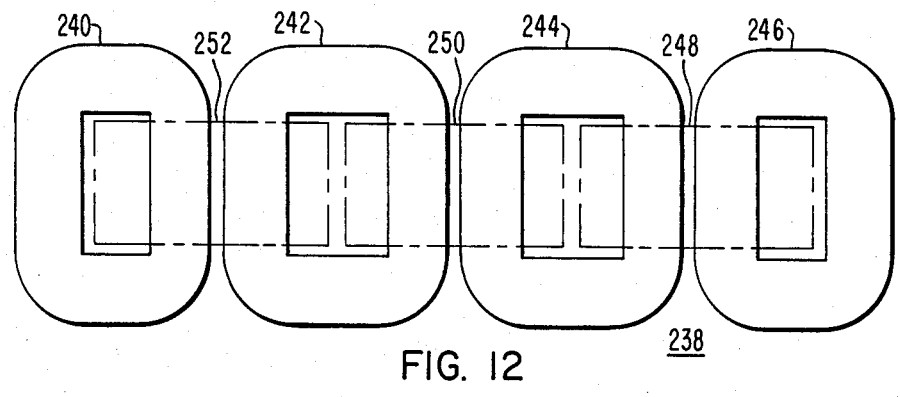
FIG. 12 shows a four-loop core suitable for practicing the present invention of FIG. 4.

The core (not shown in FIG. 4) for the rectifier transformer 110 must be such that the neutral terminal 148 can oscillate, thereby permitting the sum of the fluxes in the three-phases to be non-zero. That is, the core must include an iron flux return path. Three-phase, three-legged cores cannot be used. The rectifier transformer 110 shown schematically in FIG. 4 can be utilized on various core arrangements, including: three single-phase core-form cores such as a single-phase core-form core 226 of FIG. 6, a four-legged core-form core 228 of FIG. 7, a five-legged core-form core 230 of FIG. 8, three single-phase shell-form cores such as a single-phase shell-form core 232 of FIG. 9, a four-legged shell-form core 234 of FIG. 10, a five-legged shell-form core 236 of FIG. 11, and a four-loop core 238 of FIG. 12, comprising cores 240, 242, 244 and 246, and coils 248, 250, and 252. Any other magnetic cores magnetically equivalent to three single-phase cores are suitable for practicing the present invention. The coils arranged parallel to each other in FIG. 4 are wound on the same core leg of the cores illustrated in FIGS. 6 through 12. That is, the coils 116, 126, 140, and 146 are wound on one leg; the coils 124, 132, 138, and 144 are wound on a second leg; the coils 118, 130, 136, and 142 are wound on a third leg.

The rectifier transformer 110 can be used in rectifier systems requiring a multiplicity of phases to cancel ac harmonics when large blocks of dc power are required. The rectifier transformer 110 can be configured to provide the phase shift, $\phi$, as required for a multiple phase system. Once the desired phase shift is known, it can be implemented by selecting the proper turns ratio between the coils 116 and 118 (and the coils 124 and 126, and the coils 130 and 132). The phase shift is determined by the following equation:

$$\phi = \arctan\left(\frac{N_2 \times \mathrm{SIN}\ 60°}{N_1 + N_2 \times \mathrm{COS}\ 60°}\right)$$

$$\phi = \arctan\left(\frac{\sqrt{3}\ N_2}{2N_1 + N_2}\right)$$

where $N_1$ is the number of turns in the coils 118, 126, and 132; and where $N_2$ is the number of turns in the coils 116, 124, and 130.

In the above discussion of the preferred embodiment of the present invention, certain connections of the anode and cathode terminals of the rectifiers 150, 152, 154, 156, 158, and 160 are specified. The anode and cathode terminals of the rectifiers 150, 152, 154, 156, 158, and 160 may be reversed, thereby reversing the polarity of the rectified ac voltage between the conductors 164 and 162. In lieu of the rectifiers 150, 152, 154, 156, 158, and 160, other semiconductor devices can be used with the rectifier transformer 110. For example, thyristors could be used to provide variable voltage control.

Figure 5:
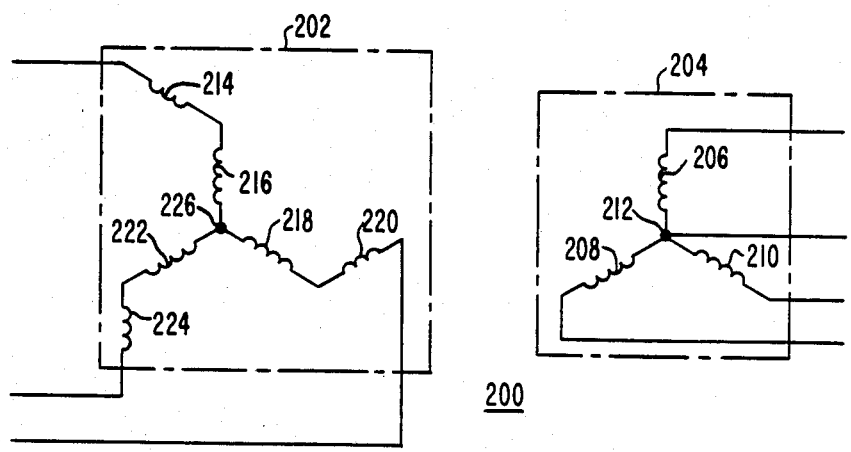
FIG. 5 shows a schematic of a prior art phase-shift transformer.

Qualitatively, it can be reasoned that the present invention illustrated in FIG. 4 performs satisfactorily. Assume the prior art circuit of FIG. 1 is supplied from the phase-shift transformer 200 illustrated in FIG. 5. The phase-shift transformer 200 is wound on three single phase cores (not shown in FIG. 5) or the magnetic equivalent. The phase shift transformer 200 comprises a primary winding 202 and a secondary winding 204. The secondary winding 204 comprises coils 206, 208, and 210; first terminals of the coils 206, 208, and 210 are connected together at a neutral terminal 212. The primary winding 202 comprises coils 214, 216, 218, 220, 222, and 224; first terminals of the coils 216, 218, and 222 are connected together at a neutral terminal 226.

It is known in the art that the phase-shift transformer 200 has a balanced three-phase output voltage, line to line, with a balanced three-phase input, line to line. A neutral terminal 212 of the phase-shift transformer 200 is unstable, oscillates, and has a high impedance. If the coils 13, 15, and 16 of the rectifier transformer 10 illustrated in FIG. 1 are connected to the coils 206, 208, and 210, respectively, of the phase-shift transformer 200 of FIG. 5, the rectifier transformer 10 functions normally. Now, if the input neutral terminal 26 of the rectifier transformer 10 (FIG. 1) is connected to the neutral terminal 212 of the phase-shift transformer 200 (FIG. 5) no neutral current flows; the connection has not disturbed operation of the rectifier transformer 10. The result is paralleling, in each phase, the secondary winding 204 of the phase shift transformer 200 and the primary winding 12 of the rectifier transformer 10. It is therefore permissable to put the coils 206, 208, 210, 214, 216, 218, 220, 222, and 224 of the phase-shift transformer 200 on the cores (not shown in FIG. 1) of the rectifier transformer 10. Elimination of the now superfluous wye primary winding 12 of the rectifier transformer 10 and the secondary winding 204 of the phase-shift transformer 200 reduces to the rectifier transformer 110 (FIG. 4) of the present invention.

What is claimed is:

1. A rectifier transformer circuit adapted for connection to a three-phase power frequency system for providing a rectified ac signal at a predetermined phase shift, without the necessity of using a phase shift transformer, or an interphase transformer, said rectifier transformer circuit comprising:
    means providing a magnetic flux path circuit including a magnetic core having an iron flux return path;
    electrical winding means;
    said electrical winding means including a zig-zag wye primary winding adapted for connection to said three-phase power frequency system, and a single six-phase star secondary winding;
    said zig-zag wye primary winding including three coils each having a zig portion having $N_1$ turns and a zag portion having $N_2$ turns, with the number of said turns being selected to obtain a predetermined phase shift $\phi$ between said primary and secondary windings according to the relationship:

$$\phi = \frac{\arctan \sqrt{3} \, N_2}{2N_1 + N_2};$$

said six-phase star secondary winding having a common terminal and a plurality of output terminals, wherein said iron flux return path allows: (a) the voltage at said common terminal to oscillate, and (b) each phase of the secondary winding to carry current for one-third of a power frequency cycle;
and a plurality of rectifier means each having first and second terminals, said first terminals each being connected to one of said plurality of output terminals and said second terminals being connected together, such that said rectified ac signal is produced between said common terminal and said second terminals.

2. The rectifier transformer circuit of claim 1 wherein the magnetic core includes three single-phase core-form magnetic cores.

3. The rectifier transformer circuit of claim 1 wherein the magnetic core includes a four-legged core-form magnetic core.

4. The rectifier transformer circuit of claim 1 wherein the magnetic core includes a five-legged core-form magnetic core.

5. The rectifier transformer circuit of claim 1 wherein the magnetic core includes a four-loop magnetic core.

6. The rectifier transformer circuit of claim 1 wherein the magnetic core includes a shell-form magnetic core.

7. The rectifier transformer circuit of claim 1 wherein the magnetic core includes three single-phase shell-form magnetic cores.

8. The rectifier transformer circuit of claim 1 wherein the magnetic core includes a four-legged shell-form magnetic core.

9. The rectifier transformer circuit of claim 1 wherein the magnetic core includes a five-legged shell-form magnetic core.

10. The rectifier transformer circuit of claim 1 wherein the magnetic core includes a magnetic core magnetically equivalent to three single-phase magnetic cores.

11. The rectifier transformer circuit of claim 1 wherein the first terminal of each of the plurality of rectifier means includes an anode terminal, and wherein the second terminal of each of the plurality of rectifier means includes a cathode terminal.

* * * * *